(12) United States Patent
Black et al.

(10) Patent No.: US 7,716,134 B2
(45) Date of Patent: May 11, 2010

(54) SELF SERVICE TERMINAL

(75) Inventors: Jonathan S. Black, Dundee (GB); Martin R. Smith, Dundee (GB); John G. Savage, Fife (GB)

(73) Assignee: NCR Corporation, Duluth, GA (US)

( * ) Notice: Subject to any disclaimer, the term of this patent is extended or adjusted under 35 U.S.C. 154(b) by 1751 days.

(21) Appl. No.: 10/051,353

(22) Filed: Jan. 18, 2002

(65) Prior Publication Data

US 2002/0099657 A1 Jul. 25, 2002

(30) Foreign Application Priority Data

Jan. 20, 2001 (GB) ................................ 0101500.7

(51) Int. Cl.
*G06Q 40/00* (2006.01)
(52) U.S. Cl. .......................... 705/43; 705/35; 705/14.64
(58) Field of Classification Search .................... 705/43
See application file for complete search history.

(56) References Cited

U.S. PATENT DOCUMENTS

| | | | |
|---|---|---|---|
| 5,389,773 A | | 2/1995 | Coutts et al. |
| 6,490,443 B1 * | 12/2002 | Freeny, Jr. .................. 455/406 |
| 6,931,538 B1 * | 8/2005 | Sawaguchi .................. 713/186 |
| 6,944,138 B1 * | 9/2005 | Song ........................ 370/310.1 |
| 7,069,018 B1 * | 6/2006 | Granstam et al. ......... 455/456.1 |
| 7,080,036 B1 * | 7/2006 | Drummond et al. ............ 705/42 |
| 7,155,199 B2 * | 12/2006 | Zalewski et al. ............. 455/403 |

2002/0013771 A1 * 1/2002 Blackson et al. .............. 705/43

FOREIGN PATENT DOCUMENTS

| | | |
|---|---|---|
| EP | 0 843 291 A | 5/1998 |
| GB | 2 282 253 | 3/1995 |
| JP | 6152773 | 5/1994 |
| JP | 9062747 | 3/1997 |
| JP | 10149400 | 6/1998 |
| JP | 315278 | 11/2000 |
| WO | WO 96/32687 | 10/1996 |
| WO | WO 98/25371 | 6/1998 |
| WO | WO 00/49547 A | 8/2000 |
| WO | WO 01/03080 A1 | 1/2001 |

OTHER PUBLICATIONS

Leigh Gregg, "Adding Muscle to your ATM Services," May/Jun. 1998, Credit Union Executive, v38n3, pp. 30-36.*

* cited by examiner

*Primary Examiner*—Narayanswamy Subramanian
*Assistant Examiner*—Seth Weis
(74) *Attorney, Agent, or Firm*—Michael Chan, Esq.

(57) ABSTRACT

A method of operating a self service terminal (SST) (12) is described, in which the SST (12) detects characteristics of a mobile computing device held by a user (16), and configures the user interface dependent on the detected characteristics. The characteristics may include features of the mobile device, such as communication facilities, or may include user identification information. Where the user is identified, a user profile may be retrieved from a remote SST operator (14). Certain embodiments of the invention may detect devices held by a second or subsequent user (18), and retrieve the relevant user profile prior to the second user (18) interacting with the SST (12).

5 Claims, 1 Drawing Sheet

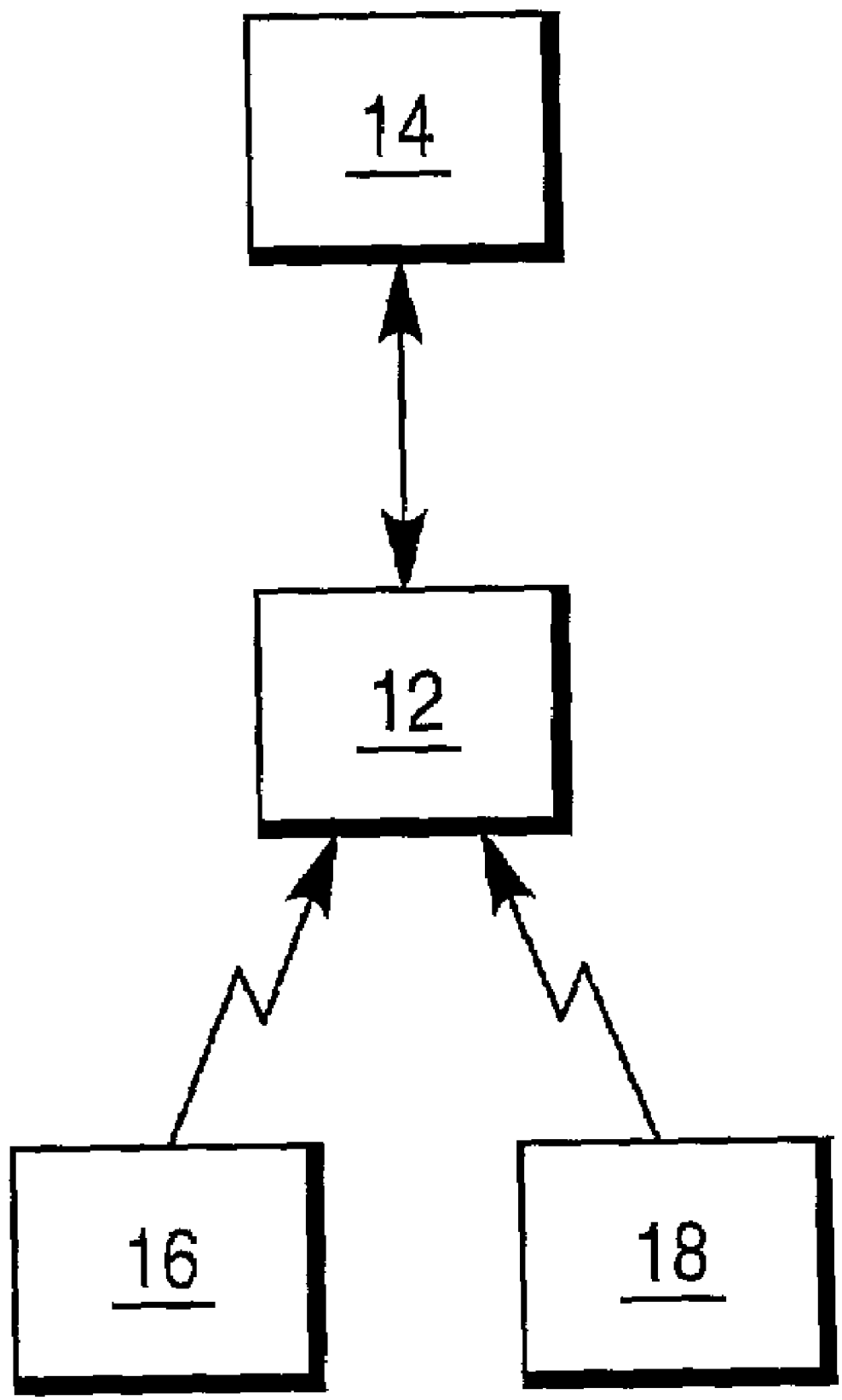

SELF SERVICE TERMINAL

BACKGROUND OF THE INVENTION

The present invention relates to a self service terminal (SST), such as an automated teller machine (ATM), and to a method of operating such an SST. More specifically, the invention relates to a method of operating an SST which makes use of mobile computing devices.

Self service terminals are widely used to conduct many different types of transaction; for example, accessing and managing bank accounts, purchase of goods or services such as travel tickets, and similar transactions. To provide a more efficient and personalised service, SST operators may wish to present specific transaction options to a user dependent on the identity and known preferences of the user. As a typical transaction requires that the user identify themselves to the SST (for example, by means of an identification token such as a smart card in combination with a personal identification number (PIN)), this is not difficult to achieve. However, to offer an appropriate personalised user interface, the SST must first determine the identity of the user; then communicate this identity to a remote server operated by the SST operator, whereupon a user profile specific to that user may be retrieved from the remote server and transferred to the SST; and finally determine which interface options are to be presented to a user with that particular profile. This process can thus take a significant amount of time, so slowing transactions and perhaps frustrating the user.

Furthermore, there is a growing tendency for individuals now to be in possession of at least one personal mobile computing device (for example, a mobile telephone; a personal digital assistant (PDA); or a palmtop computer), which may be capable of interacting with an SST. However, if the SST were to offer the option of interacting with each of these devices and any additional possible mobile devices to a user, the user may find it difficult to manage the possible choices, or to find the options relevant to themselves.

SUMMARY OF THE INVENTION

It is among the objects of embodiments of the present invention to obviate or alleviate these and other disadvantages of known SSTs. This is achieved, in part at least, in certain embodiments of the invention by the application of wireless mobile computing device technology to user interaction with an SST.

According to a first aspect of the present invention, there is provided a method of operating a self service terminal (SST), the method comprising the steps of:

detecting one or more characteristics of a mobile computing device in the vicinity of an SST; and configuring an SST user interface dependent on the detected characteristics.

Thus, the present invention allows an SST user interface to be presented which reflects some characteristic of the detected mobile device. In this way, the user may be presented only with those interaction options which reflect the capabilities of their particular mobile device, if any. Thus, the user's time will be saved as it will not be necessary for them to search for the appropriate options to select.

The detection step may make use of any appropriate technology. It is intended that broadcast wireless communications technology will be used in the present invention (for example, that known by the trade mark 'Bluetooth'); such technologies allow for communication between devices to be established non-specifically. That is, a mobile device may broadcast some signal generally to all devices in the vicinity; this signal can be detected by all suitable devices in the vicinity. No specific point-to-point communication is necessary. Thus, such broadcast wireless technology is particularly suited to use in the present invention. Of course, other forms of communication may be used, provided that some characteristic of a mobile device may be detected by an SST. The 'vicinity' of an SST, as used herein, will obviously depend on the type of communications technology used; it is however intended that devices within a radius of around 3 meters of an SST may be detected. The precise FIGURE used will also be dependent on the application to which the method is to be put.

The characteristic detected may reflect the type of device detected, or the capabilities thereof. For example, the SST may detect that a particular model of mobile telephone is in the vicinity (and hence will be able to infer the particular capabilities of that device); or the SST may detect more directly the device capabilities. For example, a PDA may broadcast that it has the ability to communicate in secure point-to-point infra-red transmission; the SST on detecting this broadcast will then be able to present the option of interacting directly with the PDA to the user. If no such capability is detected, then the option will not be presented to the user.

Alternatively, or in addition, the characteristic detected may reflect the identity of the user. For example, a PDA may be programmed to broadcast a user's 'digital signature', that is, a unique code identifying the individual to suitably-equipped devices. Thus, the SST will be able to offer services and options targeted to the specific individual using the SST. Where the identity of a user is detected, the method may comprise the further step of retrieving a user profile for that identity from a remote location. For example, the SST operator may maintain a database of user profiles reflecting the known preferences of each user; such as which services they make use of most frequently. On detection of a user's identity, the SST may retrieve this profile from the remote database, and reconfigure the user interface accordingly, for example to present the more frequently-used options before the less frequently-used options. A digital signature broadcast by a particular device may include information relating not only to the identity of the user, but also to the particular type or capabilities of the device.

Configuration of the user interface will typically comprise a software reconfiguration; for example, the particular list of available options to be presented to the user may be selected from a stored master list; or the order and manner of presentation may be modified. The configuration step does not necessarily imply a hardware reconfiguration; although such a configuration may nonetheless be performed. For example, a particular form of plug-in interface may be presented to interact with a detected type of mobile device.

The detection step may also include the step of detecting those devices which do not belong to the user currently interacting with the SST. For example, if the SST is being used, and a second individual approaches the SST, the individual will join a queue. While queuing, the SST will nonetheless detect the characteristics of that individual's mobile devices. The SST may therefore retrieve the relevant user profile from a remote location before the relevant user begins to interact with the SST. Thus when the previous user has finished, the SST may reconfigure the user interface appropriately without a delay while the user profile is retrieved. This can therefore reduce the time taken to conduct a transaction. Where a number of differently-owned devices are detected, the method may further comprise the step of ordering each user profile in accordance with the time that the detected device has been in the vicinity of the SST. This time will reflect the time spent queuing, and so should also reflect the order in which the individuals will use the SST. The relevant user profiles may thus be made available in an appropriate sequence.

The method may still further comprise the step of displaying advertisements or other information selected according to the detected characteristics of a mobile device. For example, advertisements may be displayed based on the interests of a user as recorded in their user profile. The advertisements may be displayed to individuals either when using the SST, or to individuals waiting in a queue. Where a number of individuals are queuing, the advertisements may be selected to interest all or only some of the individuals; or different directed advertisements may be displayed to each queuing individual.

Users may also register their mobile devices with the SST operator; in this case, the SST will first detect all mobile devices but will only respond to those which are registered. This may allow the SST operator to further personalise the SST options being offered, as the operator will have information regarding the devices likely to be held by users; in addition, advertisements or information may be sent to users' devices even when the user is not making use of an SST, if the operator is aware of the devices owned by the user.

According to a further aspect of the present invention, there is provided a method of operating a self service terminal (SST), the method comprising the steps of:

detecting selected capabilities of a mobile computing device in the vicinity of an SST; and selecting features of a user interface to be presented to a user dependent on the detected capabilities of the mobile computing device.

According to a still further aspect of the present invention, there is provided a method of operating a self service terminal (SST), the method comprising the steps of:

detecting a mobile computing device and the identity of a user thereof in the vicinity of an SST;

retrieving a user profile associated with said identity; and selecting features of a user interface to be presented to a user dependent on said user profile.

According to a yet further aspect of the present invention, there is provided a method of operating a self service terminal (SST), the method comprising the steps of:

detecting a characteristic of a mobile computing device in the vicinity of an SST while the SST is interacting with a third party;

selecting features of a user interface to be presented to a user dependent on said characteristic; and presenting a selected user interface to a user once the third party has ceased interacting with the SST.

According to a still further aspect of the present invention, there is provided a self service terminal (SST) comprising a configurable user interface; means for detecting a characteristic of a mobile computing device in the vicinity of the SST; and means for determining the configuration of the user interface to be presented in response to detected characteristics.

The detecting means may be a radio or other electromagnetic receiver.

The determining means may be a computing device.

BRIEF DESCRIPTION OF THE DRAWINGS

These and other aspects of the present invention will now be illustrated by way of example only and with reference to the accompanying drawing, which shows a sketch of an implementation of one embodiment of a method according to the present invention.

DETAILED DESCRIPTION

Referring to the FIGURE, this shows a self service terminal (SST) 12 which is in communication with a remote server 14, operated by the SST operator. Two users 16, 18 are adjacent the SST 12, with each user 16, 18 carrying at least one mobile computing device with a wireless communication facility. The first user 16 is currently at the SST 12 and is about to commence a transaction, while the second user 18 is waiting to use the SST 12 after the first user 16 has completed their transaction.

Each mobile device held by the users 16, 18 periodically broadcasts a signal to suitable receivers in the local vicinity. The mobile devices may include a mobile telephone, a personal digital assistant (PDA), a palmtop computer, or even a 'tag' which uses wireless technology attached to items such as clothing, wallets, keys and the like. The signal broadcast by each device includes information regarding the type of device and the functionalities possessed by that device; and information regarding the identity of the device's owner (a 'digital signature'). The SST 12 is provided with a receiver for detecting these broadcast signals.

As the first user 16 approaches the SST 12, the signals broadcast from the user's mobile devices are detected by the SST 12. The SST 12 determines from the information given which devices the user 16 has in their possession, and the capabilities of each device. For example, the SST 12 may detect that the user 16 has a mobile telephone which can receive SMS (short message service) messages.

In addition to determination of the device capabilities, the SST 12 also detects the digital signature of the user 16. This digital signature is transferred from the SST 12 to the remote server 14, where the signature is compared against a database of users maintained by the SST operator. The database contains details of users' digital signatures, their identities as known to the SST operator, and details of their interests and most frequently-used services accessed from SSTs. The relevant information from the database is then passed from the remote server 14 to the SST 12.

When the user 16 is ready to begin their transaction with the SST 12, the user 16 conducts a separate identification step; typically by means of presenting a smart card together with a personal identification number (PIN). This separate step is conducted for security purposes, and to ensure that the user 16 is not in possession of another person's mobile devices. Of course, this additional identification step need not be conducted in all embodiments of the invention.

The identification of the user 16 may be rapidly confirmed by the SST 12, since the relevant details of the user 16 have already been retrieved from the remote server 14. Thus confirmation is an entirely local process, and does not require communication with a remote server once the user has asserted an identity.

After the identity of the user 16 has been confirmed, the SST 12 displays a series of possible transaction options to the user 16, the available options and their presentation having been selected based on the details of the user 16 retrieved from the remote server 14. For example, if the user 16 frequently withdraws a certain amount of cash from SSTs, then this option will be immediately accessible to the user 16. Similarly, if the SST 12 has detected that the user 16 is carrying a mobile telephone, the SST 12 may present the user 16 with the option to transmit details of the user's balance or most recent transactions to their telephone via the SMS facility. If the user 16 is not carrying a mobile telephone at the time of the transaction, this option will not be displayed.

Similarly, the user interface of the SST 12 may be configured to display advertisements to the user 16 during the transaction; these advertisements may be targeted to the user 16 based on their known interests, or based on the devices which the user 16 is currently carrying.

While the first user 16 is conducting a transaction at the SST 12, the second user 18 is waiting in a queue. The SST 12 also detects signals from this second user's mobile devices, and so is aware of their identity and available mobile devices. While the first user 16 is conducting a transaction, the SST 12 may simultaneously be in communication with the remote server 14 to retrieve relevant details of the second user 18; thus, once the first user 16 has left the SST 12, the SST 12 will be immediately prepared and configured to interact with the second user 18. This assists in reducing the delay time between users, as the necessary data has already been retrieved by the SST 12. The processing of this data may occur during the 'idle' time of the transaction being performed between the current user and the SST. When the transaction between the current user finishes and the user in the queue begins their transaction with the SST, the user profiling information will be in a ready local store and thus the configured user interface may be provided more rapidly.

Furthermore, advertisements and other information may be displayed to the second waiting user 18 while queuing; again these advertisements may be targeted to the second user 18 based on the details obtained by the SST 12. The advertisements to the queue may be displayed on a VDU or electronic billboard or the like, directed toward the queue.

If a number of additional users join the queue, the SST 12 can detect the devices of all of the waiting users. The various user details may be retrieved by the SST 12 and stored in an internal queue reflecting the time which each user has spent in the vicinity of the SST 12; thus each user profile may be acted upon by the SST 12 in the correct order, so reducing delay between users. If desired, the queuing information may also be used by the SST 12 to ensure that the waiting users do not 'jump' the queue.

In addition, where a number of users are queuing to use the SST 12, the SST operator may choose to send messages or otherwise interact with each user's available devices; for example, messages may be sent to users' mobile telephones indicating that a telephone-based banking service is available and that the user would thus not need to queue. Alternatively, the users may be notified that they may use certain mobile devices to commence their transactions with the SST 12 whilst queuing. For example, those users in the queue with PDAs may be notified that they may enter a desired transaction on their PDA and transfer details of that transaction to the SST 12. Once the relevant user reaches the front of the queue and begins their transaction with the SST 12, completion of this requested transaction may be offered to the user as an initial option on the SST user interface. In this way, the delay caused by queuing may be reduced.

Thus, it can be seen that the present invention provides a method whereby mobile devices in communication with a self service terminal may be used to assist the SST operator in preparing for a user's transactions with the SST, and in personalising and configuring the user interface of the SST. This not only reduces the time taken for the user to complete their transactions, but also makes the experience more user-friendly and appropriate to the user's particular needs.

What is claimed is:

1. A method of operating a self service terminal (SST), the method comprising the steps of:

receiving wireless communication signals from a first mobile computing device which is in the vicinity of the SST and which belongs to a first user who is currently interacting with the SST to conduct a first transaction at the SST;

engaging in communication with the first mobile computing device to detect one or more characteristics relating to device capabilities of the first mobile computing device and user preferences of the first user of the first mobile computing device;

receiving wireless communication signals from a second mobile computing device which is different from the first mobile computing device and which is also in the vicinity of the SST but which belongs to a second user who is not currently interacting with the SST;

engaging in communication with the second mobile computing device to detect one or more characteristics relating to device capabilities of the second mobile computing device and user preferences of the second user of the second mobile computing device;

configuring a first user interface of the SST to accommodate detected device capabilities and user preferences for the first user of the first mobile computing device who is currently conducting the first transaction at the SST, configuration of the first user interface of the SST including adapting information presented on a display screen of the SST based on device capabilities and user preferences of the first user of the first mobile computing device; and while the first user of the first mobile computing device is interacting with the first user interface to conduct the first transaction at the SST, configuring a second user interface of the SST to accommodate detected device capabilities and user preferences for the second user of the second mobile computing device who is not currently interacting with the SST before the second user begins to interact with the SST, configuration of the second user interface of the SST including adapting information to be presented on the display screen of the SST based on device capabilities and user preferences of the second user of the second mobile computing device so that the second user of the second mobile computing device can interact with the second user interface to conduct a second transaction at the SST after the first user of the first mobile computing device has completed the first transaction at the SST.

2. A method of claim 1, further comprising transmitting advertising material to the second mobile computing devices of the second user who is not currently interacting with the SST.

3. A method of claim 2, wherein the advertising material includes a notification of remote banking services available through the second mobile computing device of the second user who is not currently interacting with the SST.

4. A method of claim 3, further comprising receiving details of the second transaction from a the second user who is not currently interacting with the SST and presenting the second user with an option of completing the second transaction when the second user approaches the SST to begin interaction with the SST to complete the second transaction.

5. A method of operating a self service terminal (SST), the method comprising the steps of:

receiving wireless communication signals from a first mobile computing device which is in the vicinity of an SST and which belongs to a first user who is currently interacting with the SST to conduct a first transaction at the SST;

engaging in communication with the first mobile computing device to identify selected capabilities of the first mobile computing device and to detect a digital signature of the first user of the first mobile computing device;

receiving wireless communication signals from a second mobile computing device which is different from the first mobile computing device and which is also in the vicinity of an SST but which belongs to a second user who is not currently interacting with the SST;

engaging in communication with the second mobile computing device to identify selected capabilities of the second mobile computing device and to detect a digital signature of the second user of the second mobile computing device;

selecting features of a first user interface to be presented to the first user of the first mobile computing device dependent on the detected capabilities of the first mobile computing device, the features of the first user interface being adapted to accommodate the detected capabilities of the first mobile computing device; and while the first user of the first mobile computing device is interacting with the first user interface to conduct the first transaction at the SST, selecting features of a second user interface to be presented to the second user of the second mobile computing device dependent on the detected capabilities of the second mobile computing device, the features of the second user interface being adapted to accommodate the detected capabilities of the second mobile computing device so that the second user of the second mobile computing device can interact with the second user interface to conduct a second transaction at the SST after the first user of the first mobile computing device has completed the first transaction at the SST.

* * * * *